(12) United States Patent
Ansari et al.

(10) Patent No.: US 11,375,253 B2
(45) Date of Patent: Jun. 28, 2022

(54) LINK BANDWIDTH IMPROVEMENT TECHNIQUES

(71) Applicant: Intel Corporation, Santa Clara, CA (US)

(72) Inventors: Nausheen Ansari, Folsom, CA (US); Ziv Kabiry, Haifa (IL)

(73) Assignee: Intel Corporation, Santa Clara, CA (US)

( * ) Notice: Subject to any disclaimer, the term of this patent is extended or adjusted under 35 U.S.C. 154(b) by 15 days.

(21) Appl. No.: 16/413,410

(22) Filed: May 15, 2019

(65) Prior Publication Data

US 2019/0268629 A1    Aug. 29, 2019

(51) Int. Cl.
| | |
|---|---|
| *H04N 21/238* | (2011.01) |
| *H04N 21/633* | (2011.01) |
| *H04N 21/24* | (2011.01) |
| *H04N 21/647* | (2011.01) |

(52) U.S. Cl.
CPC ....... *H04N 21/238* (2013.01); *H04N 21/2402* (2013.01); *H04N 21/633* (2013.01); *H04N 21/64792* (2013.01)

(58) Field of Classification Search
CPC ............. H04N 21/238; H04N 21/2402; H04N 21/633; H04N 21/64792
USPC ........................................................ 725/116
See application file for complete search history.

(56) References Cited

U.S. PATENT DOCUMENTS

| | | | |
|---|---|---|---|
| 6,369,855 B1 * | 4/2002 | Chauvel ................. | H04L 29/06 348/423.1 |
| 2002/0136298 A1 * | 9/2002 | Anantharamu .... | H04N 21/2402 375/240.12 |
| 2015/0085863 A1 * | 3/2015 | Wu ....................... | H04L 45/742 370/392 |

(Continued)

FOREIGN PATENT DOCUMENTS

| | | | |
|---|---|---|---|
| EP | 3340635 | 6/2018 | |
| WO | WO-2006006127 A2 * | 1/2006 | ............... H04N 5/44 |

OTHER PUBLICATIONS

VESA DisplayPort (DP) Standard, 2019 Video Electronics Standards Association, Feb. 22, 2019, 1089 pages.

(Continued)

*Primary Examiner* — Nathan J Flynn
*Assistant Examiner* — Caroline Somera
(74) *Attorney, Agent, or Firm* — Hanley, Flight & Zimmerman, LLC

(57) ABSTRACT

One embodiment provides a video transport system. The video transport system includes graphics processing circuitry to generate a video transport unit (TU) corresponding to a scan line of a first video frame that is unchanged from a second video frame, wherein the video TU includes a control sequence and an unchanged data payload corresponding to a defined number of pixels of the scan line of the first video frame. The video transport system of this embodiment also includes source tunneling bridge circuitry to generate a bus TU based on the video TU; the source tunneling bridge circuitry to parse the control sequence or the unchanged data payload of the video TU, and to generate the bus TU having a header that includes a field to identify the defined number of pixels of the unchanged data payload, and to eliminate, in whole or in part, the unchanged data payload in the bus TU.

16 Claims, 6 Drawing Sheets

(56) References Cited

U.S. PATENT DOCUMENTS

| | | | |
|---|---|---|---|
| 2016/0344643 A1* | 11/2016 | Stanwood | H04N 21/2402 |
| 2017/0026439 A1* | 1/2017 | Verma | H04N 21/4343 |
| 2018/0130443 A1* | 5/2018 | Ansari | G09G 5/14 |
| 2019/0043458 A1 | 2/2019 | Kwa et al. | |

OTHER PUBLICATIONS

European Patent Office, "Extended European Search Report," dated Nov. 2, 2020 in connection with European Patent Application No. 20166254.1, 5 pages.

European Patent Office, "Communication under Rule 71(3) EPC," mailed in connection with European Patent Application No. 20166254.1, dated Jun. 30, 2021, 32 pages.

* cited by examiner

LINK BANDWIDTH IMPROVEMENT TECHNIQUES

FIELD

The present disclosure relates to link bandwidth improvement techniques, and, more particularly, to link bandwidth improvement techniques in a video processing system.

BACKGROUND

In DisplayPort, packets known as "Transfer Units (TU) or "Micro-Packets" are formed as a set of data and control symbols. With Panel Replay defined by current versions of DisplayPort, a source device transmits portions of the frame that are modified relative to the previous frame along with "dummy" data for the unmodified region which is discarded by a sink device. Since all of the data in a video stream in DisplayPort is encrypted, the transport (e.g., USB) is unable to determine the "dummy" data in Panel Replay mode without decrypting the stream.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure relates to techniques to improve efficiency and bandwidth usage in a video processing system. In some embodiments described herein, video frame data may be parsed and compared to a previous video frame to determine unmodified/unchanged regions of the frame. The unmodified/unchanged regions may be encoded with a control symbol that designates a region as being unmodified from a previous frame. The video frame data may be encoded and transmitted using a bus communications protocol. The unmodified/unchanged regions of the frame may be eliminated, in whole or in part, prior to transmission to one or more sink devices, and the encoded video frame may include information to recreate, in the sink device, the unmodified/unchanged regions. Thus, in these embodiments, overall packet transport size for a given frame may be significantly reduced, and thus a bandwidth requirement to transmit an encoded frame may be significantly reduced. In some embodiments described herein, unused bandwidth to transmit these reduced-size packets may be reallocated to other bus-connected devices.

Figure 1:
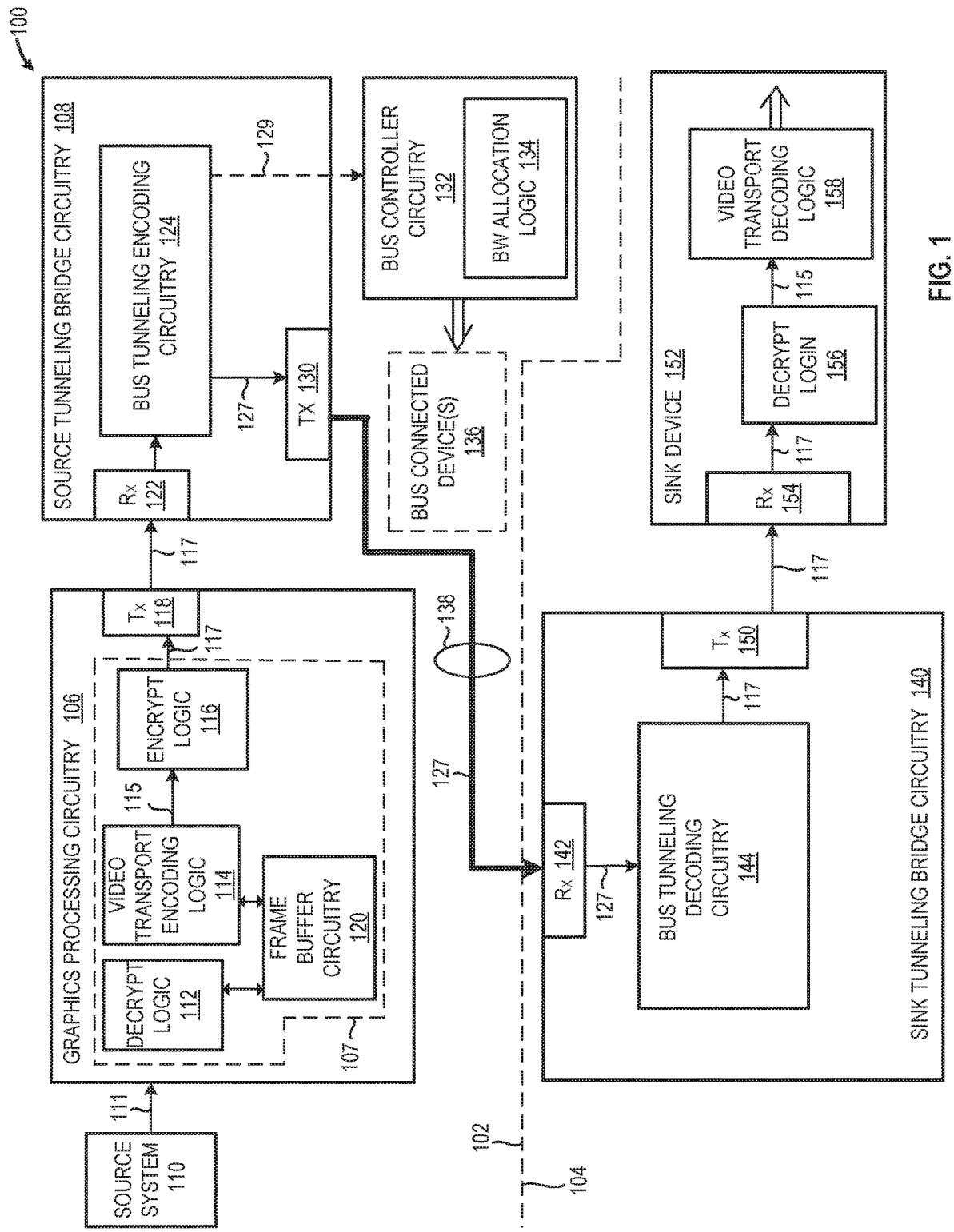
FIG. 1 illustrates a block diagram of an example video processing system according to various embodiments of the present disclosure.

FIG. 1 illustrates a block diagram of an example video processing system 100 according to various embodiments of the present disclosure. The video processing system 100 generally includes a source domain 102 generally configured to process and transmit video data and a sink domain 104 generally configured to receive and consume video data from the source domain 102, via link 134. The source domain 102 includes graphics processing circuitry 106 generally configured to receive protected video data 111 from a source system 110 and encode the protected video data 111 using a video transport encoding protocol. The video transport encoding protocol may include a packetized video transport protocol, for example, DisplayPort, HDMI, etc. The source domain 102 also includes source tunneling bridge circuitry 108 generally configured to receive the video frame data from the graphics processing circuitry 106 that is encoded using the video transport encoding protocol and encode the video frame data using a bus encoding protocol. The bus encoding protocol may include a serialized bus communications protocol, for example, a universal serial bus (USB) communications protocol, Thunderbolt serial bus communications protocol, FireWire serial bus communications protocol, etc. The bus-encoded video frame data may be transmitted to the sink domain 104 via link 138. The link 138 may comply or be compatible with the bus encoding protocol, for example, a USB link. Thus, in at least one embodiment described herein, the source domain 102 may generate a DisplayPort over USB encoded data stream from the source video data 111. The sink domain 104 generally includes sink tunneling bridge circuitry 140 generally configured to decode and consume the video data. The source domain 102 and sink domain 104 are described in greater detail below.

Source system 110 is generally configured to transmit protected video data 111. The source system may include, for example, a computer system, video source system (e.g., automobile video display system, portable video display system, etc.), handheld device (e.g. smartphone, portable computer (e.g., laptop computer system, iPad, etc.), and/or other system generally configured to initiate and/or transmit protected video content. For example, a computer system may include a DVD/BluRay player (not shown) to initiate protected video content on a DVD/BluRay disk. In another example, the source system 110 may include a portable computer system configured to receive protected video content from a third-party source, for example, Netflix video content, Amazon Prime video content, etc. The protected video data 111 may be encrypted using conventional memory encryption protocols and/or proprietary memory encryption protocols.

Graphics processing circuitry 106 includes decryption logic 112 configured to decrypt the protected video data 111 received from the source system 110, and store protected and decrypted video frame data in a memory, for example, frame buffer circuitry 120. Decryption logic 112 may utilize a decryption protocol that complies or is compatible with the protection protocol of the protected video data 111. The frame buffer circuitry 120 may store a plurality of video frames in encrypted format, including a current video frame and a previous video frame. Video frame data may be organized as a two-dimensional array of pixel data, for example, 1024×768 pixels, 2048×2048 pixels, 4096×4096 pixels (e.g., high definition, ultra-high definition video content), etc. Graphics processing circuitry 106, as a general matter, may process video frame data on a scan line basis corresponding to a scan line of a display, and each scan line may include one or more horizontal lines of video data, and each scan line includes a plurality of pixels. The graphics processor circuitry 106 also includes video transport encoding logic 114 configured to compare a scan line of a current video frame with a scan line of a previous video frame to determine if a scan line of a current video frame is changed or unchanged from a scan line of a previous video frame.

Video transport encoding logic 114 is also generally configured to encode unencrypted video frame data using a video transport encoding protocol. The video transport encoding protocol may include a packetized video transport protocol, for example, a DisplayPort encoding protocol. The DisplayPort encoding protocol may comply, or be compatible with, standard specifications defined by "VESA DisplayPort (DP) Standard, Version 2.0 (proposed), d2, 22 Feb. 2019", and/or previous versions of this standard and/or future versions of this standard. Using the DisplayPort encoding protocol as an example, each scan line of a video frame may be broken up into a plurality of video transport units (TUs), where each video TU includes, inter alia, one or more control sequences and data payload, as defined by the DisplayPort protocol. The data payload portion of a TU represents pixel data for a defined number of pixels of a scan line, for example, 32 pixels, 64 pixels, etc., as may be specified by the DisplayPort protocol. In addition, the DisplayPort encoding protocol may operate in a plurality of modes, depending on, for example, the way in which video content is consumed by the sink domain 104. For example, video transport encoding logic 114 may be configured to encode video data in a DisplayPort single-stream transport (SST) mode, where the SST mode generally encodes a single stream of video data to be consumed (e.g., displayed on a display monitor) for a single device in the sink domain 104 (and in some embodiments, the video data may be bridged and/or hopped to other devices in the sink domain 104). As another example, video transport encoding logic 114 may be configured to encode video data in a DisplayPort multi-stream transport (MST) mode, where the MST mode generally encodes one or more distinct streams of video data to be consumed simultaneously by one or more devices in the sink domain 104 (e.g., multiple display monitors, each displaying distinct video content).

As used herein, an "unchanged TU" means a TU having a payload portion (pixel data) that is the same pixel data of a previous video frame. The unchanged data may also be referred to herein as "non-active" as compared to a previous data frame, and thus "non-active" and "unchanged" may be used interchangeably throughout this disclosure. Similarly, "changed" and "active" may be used interchangeably herein as referring to a scan line of a current video frame that has changed from a previous video frame. Also, "previous video frame" as used herein, generally means a video frame that is previous to the current video frame in a sequence of video frames, and in some embodiments, the previous video frame may be the video frame immediately before the current video frame, although in other embodiments, the previous video frame may be a video frame that is sequentially more than one video frame before the current video frame.

As described above, video transport encoding logic 114 is configured to determine unchanged and changed scan line data as compared to a previous frame. Video transport encoding logic 114 is generally configured to generate a stream of video TUs 115, each TU 115 having characteristics based on the mode of operation (e.g., SST, MST) and whether the scan line is changed or unchanged from a previous scan line. Accordingly, as used herein, TU may be used singularly and TUs may refer to the stream of encoded data that includes a plurality of individual TUs. For a scan line that is unchanged from a previous frame, and using a DisplayPort encoding protocol in SST mode as an example, the video transport encoding logic 114 is configured to generate at least one unchanged video TU 115, where the unchanged video TU 115 includes an unchanged control sequence and an unchanged data payload. The unchanged control sequence, in SST mode, may include, for example, a control sequence that is reserved by the DisplayPort protocol specification, for example, a K28.7 blank end control sequence. A "reserved" control sequence, as used herein, means a field that is specifically defined by a packetized video transport protocol, but is currently unused and/or unassigned. The unchanged data payload, in SST mode, may include, for example, "dummy" data (i.e., data that generally does not correspond to pixel data, but rather, may be a sequence of defined and/or random data generated by the video transport encoding logic 114). For a scan line that is changed from a previous frame, and again using a DisplayPort encoding protocol in SST mode as an example, the video transport encoding logic 114 is configured to generate at least one changed video TU 115, where each changed video TU 115 includes a changed control sequence and a changed data payload. The changed control sequence, in one example embodiment, may include a control sequence that is defined by the DisplayPort protocol specification, for example, a K27.7 blank end control sequence. The changed data payload generally corresponds to pixel data that is changed from the previous frame.

In MST mode, video transport encoding logic 114 is generally configured to generate a plurality of TUs 115, where each TU 115 includes one or more control sequences and two or more data payload sections and where each data payload section corresponds to a distinct video stream. In MST mode, for a scan line of at least one video stream that is unchanged from a previous frame, the video transport encoding logic 114 is configured to generate at least one unchanged video TU 115, where each unchanged video TU 115 includes at least one unchanged data payload. In MST mode, the unchanged data payload may include, for example, a plurality of reserved control sequences (e.g., C7-C7-C7-C7), where the reserved control sequences may be reserved and defined in the DisplayPort protocol. In MST mode, in the case when scan lines for all the video streams are changed from corresponding scan lines of previous frames, the video transport encoding logic 114 is configured to generate at least one of changed video TU 115, where each changed video TU 115 includes a plurality of changed data payload sections. Thus, in MST mode, a TU 115 may be changed, partially unchanged, or wholly unchanged, depending on the status of the data payload sections. In both SST and MST mode for unchanged data, the unchanged data payload represents unchanged pixel data (e.g., using either "dummy" data (SST mode) or defined sequences (MST mode)).

It should be noted that a single frame may include a mix of changed and unchanged TUs, in either operating mode, depending on status (changed or unchanged) of a current scan line of a given frame. Also, in some embodiments described herein, regarding identifying a changed scan line verses an unchanged scan line, the video encoding logic 114 may follow an "all or nothing" rule, meaning that if any pixel within a scan line has changed from a previous frame, video encoding logic 114 may consider that a changed scan line for purposes of generating TUs for that scan line. Rather than using a scan line as the metric unit for comparison, in other embodiments a group of pixels and/or block of pixels (e.g., block of pixels corresponding to the data payload size of a TU) may be used as the metric for comparison, which may offer enhanced reduction of overall transport size of a frame.

As a general matter, certain control sequences (e.g., K27.7 and K28.7 control sequences) and unchanged data payloads of TUs 115 may remain unencrypted throughout the transport process, since these commands and data do not represent information that requires encryption to comply with, for example, end-to-end protection requirements, etc. Graphics processor circuitry 106 may also include encryption logic 116 configured to encrypt changed data payloads of TUs 115 and generate a stream of at least partially encrypted video TUs 117. Encryption logic 116 may include encryption protocols that comply with video industry standards, for example high definition content protection (HDCP), etc. and/or other conventional and/or proprietary encryption protocols. Thus, the processing requirements to encrypt the data payloads of unchanged TUs 113 may be reduced or eliminated. In some embodiments, for example to comply with end-to-end encryption requirements, the decryption logic 112, frame buffer circuitry, video transport encoding logic and/or encryption logic 116 may be sequestered within a trusted execution environment (TEE) 107, for example a secure enclave (SE) execution environment and/or other conventional and/or proprietary secure environment to prevent exposure of unencrypted data. Graphics processor circuitry 106 may also include transmit (Tx) circuitry 118 configured to transmit the partially encrypted video TUs 117. Transmit circuitry 118 may include physical interface circuitry (PHY circuitry, not shown) to transmit data using a clocked serialized data stream (e.g., 8b/10b encoding, 130b/132b encoding, etc.).

Source tunneling bridge circuitry 108 includes receive (Rx) circuitry 122 to receive the stream of partially encrypted video TUs 117. Bus tunneling encoding circuitry 124 is generally configured to encode the partially encrypted video TUs 117 using a bus communication protocol, thus generating a stream of bus TUs 125. In one example embodiment, the bus communication protocol is a universal serial bus (USB) communications protocol, for example, that complies or is compatible with a USB 4.x standard and/or earlier and/or later versions of this standard. Bus tunneling encoding circuitry 124 is configured to parse the partially encrypted video TUs 117 to determine if a TU 117 includes a changed or unchanged data payload. As described above, in SST mode an unchanged TU 115 may include a reserved control sequence (e.g., K28.7) and a "dummy" data payload, that remain unencrypted, representing unchanged data. In MST mode, a TU 115 may include at least one data payload section having reserved control sequences, that remain unencrypted, representing unchanged data. Bus tunneling encoding circuitry 124 is configured to eliminate, in whole or in part, data payload sections representing unchanged data in both SST and MST modes. In SST mode, for a video TU 117 that includes a reserved control sequence and a "dummy" data payload, bus tunneling encoding circuitry 124 generates a bus TU 125 that includes a header and eliminates, in whole or in part, the "dummy" data payload. Also in SST mode, for a video TU 117 that includes a control sequence and an encrypted data payload, bus tunneling encoding circuitry 124 generates a bus TU 125 that includes a header and the encrypted data payload. The header of bus TU 125, in SST mode and for an unchanged video TU 117, includes at least one defined and/or reserved data field section that is populated with information/data to enable the sink domain 104 to recreate the "dummy" associated with the video TU 115, as described below. In MST mode, for a video TU 117 that includes a control sequence and at least one data payload section that includes reserved control sequences, bus tunneling encoding circuitry 124 generates a bus TU 125 that includes a header and eliminates, in whole or in part, the at least one data payload section that includes control reserved sequences. In MST mode, for a video TU 117 that only includes a control sequence and one or more encrypted data payload sections, bus tunneling encoding circuitry 124 generates a bus TU 125 that includes a header and the encrypted data payload sections. The header of bus TU 125, in MST mode and for a video TU 117 having at least one unchanged data payload section, includes at least one defined and/or reserved data field section that is populated with information/data to enable the sink domain 104 to recreate the unchanged data payload section included with the video TU 115, as described below.

By eliminating the unchanged data payload, in whole or in part, the bus TU 125 of the present disclosure may offer significant link bandwidth savings over conventional approaches. For example, a typical bus TU may be on the order of 256 Bytes or larger, but a size of the bus TU 125 of the present disclosure may be significantly reduced to on the order of 32 bits (3 bytes) in SST mode. In addition, since the unchanged data and unchanged control sequence may remain unencrypted throughout the transport process, processing overhead may be reduced since source tunneling bridge circuitry 108 can reduce or eliminate decryption and re-encryption operations for the encrypted TU stream 117. It should be noted that "eliminate, in whole or in part", as used herein, means that the data payload portion of a transport packet may be significantly or completely reduced. Thus, the teachings of the present disclosure may encompass embodiments where the unchanged data payload is not completely eliminated and is replaced by a trivial amount of data compared to a conventional data payload size.

Source tunneling bridge circuitry 108 also includes transmit (Tx) circuitry 130 to transmit bus TUs 125, via bus link 138, to the sink domain 104. Link 138 may comply or be compatible with the bus communications protocol, for example the aforementioned USB bus communications protocol. Thus, in some embodiments, link 138 is a USB-compliant cable (e.g., ESB-C type cable, etc.) to couple the source domain 102 to the sink domain 104. It should be noted that TUs 125 may be part of a continuous packet stream over the bus link 138.

Source domain 102 also includes bus controller circuitry 132 generally configured to exchange commands and data with a plurality of bus-connected devices 136. Bus controller circuitry 132 may comply or be compatible with the bus communications protocol, for example the aforementioned USB bus communications protocol and bus-connected devices 136 may include, for example, conventional and/or proprietary USB devices (e.g., hard disk drives, video processing circuitry, etc.) and also includes source tunneling bridge circuitry 108 and sink tunneling bridge circuitry 140 as USB-connected devices. Bus connected devices 136 may each be connected to bus controller circuitry 132 via a link, similar to link 138. The bus controller circuitry 132 may include bandwidth allocation logic 134 configured to allocate bandwidth among the plurality of bus-connected devices 136. Bandwidth allocation may include, for example, establishing bandwidth parameters for each bus connected device 136, for example establishing a maximum data rate and/or clock speed for a given link, establishing a minimum data rate and/or clock speed for a given link, etc. Bandwidth allocation logic 134 may be configured to dynamically adjust bandwidth parameters for the bus connected devices 136 to enable, for example, excess bandwidth on one device to be allocated to another device. In the context of the present disclosure, bus tunneling encoding circuitry 124 may be configured to generate a bandwidth usage control signal 127 and forward the bandwidth usage control signal 127 to bus controller circuitry 132. In response to the bandwidth usage control signal 127, bus controller circuitry 132 may reallocate unused bandwidth of the bus tunneling bridge circuitry 124 to one or more other bus-connected devices 136. For example, bus controller circuitry 132 may assign a maximum data rate and/or clock speed for the source tunneling bridge circuitry 108 to transmit commands and data to the sink domain 104. For example, a TU 125 that has eliminated, in whole or in part, the unchanged data payload sections, may be much smaller than a TU 125 that includes the encrypted data payload section(s), and a maximum data rate allocated to bus tunneling encoding circuitry 124 may be based on the largest expected size of TU 125. During transmission of a TU 125 that has eliminated, in whole or in part, the unchanged data payload sections, the required bandwidth may be correspondingly less than the maximum allocated bandwidth, i.e., transmission of such a TU 125 may result in unused bandwidth. Accordingly, bus controller circuitry 132 may allocate the unused bandwidth to other bus-connected devices 136. Thus, significant efficiency of bus controller circuitry 132 may be achieved.

The sink domain 104 includes sink domain tunneling bridge circuitry 140 generally configured to decode the bus TUs 125 received via link 138, as described below. Sink domain tunneling bridge circuitry 140 includes receive (Rx) circuitry 142 to receive commands and data from the source domain 102, via link 138. Sink domain tunneling bridge circuitry 140 includes bus tunneling decoding circuitry 144 to decode bus TUs 125 to generate partially encrypted video TUs 117. In particular, bus tunneling decoding circuitry 144 is configured to parse the header of bus TU 125 to generate a changed or unchanged video TU 117 in SST mode, or a changed, partially unchanged or wholly unchanged video TU 117 in MST mode. In SST mode, information in the defined and/or reserved data field the header may be used to recreate the "dummy" data for the unchanged data payload of an unchanged TU 117. Also, in SST mode, the reserved control sequence (e.g., K28.7) may be replaced with a conventional control sequence, for example, a K27.7 control sequence. Similarly, in MST mode, information in the defined and/or reserved data field the header may be used to recreate the reserved control sequences for the unchanged data payload of an unchanged and/or partially unchanged video TU 117. For bus TUs that are changed in SST mode, or partially or wholly changed in MST mode, bus tunneling decoding circuitry 144 may also be configured to parse the header of bus TU 127 to generate a video TU 117, having control sequences and at least one data payload section that remains encrypted. Thus, TUs 117 may represent a stream of TUs having both encrypted and unencrypted data payload sections. Sink domain tunneling bridge circuitry 140 also includes transmit (Tx) circuitry 150 to transmit the video TU stream 117 to one or more sink devices 152.

Sink device 152 may be generalized as an end point for consumption of the video data contained within the video TU stream 117. A sink device may include, for example, a display device (e.g., LCD display, etc.), storage device, etc. In general, a sink device 152 may include receive (Rx) circuitry 154 to receive a video TU stream 150 from the sink tunneling bridge circuitry 140. Sink device 152 may also include decryption logic 156 to decrypt encrypted data payload section(s) of TUs within the video TU stream 117 and generate an unencrypted video TU stream 115. Decryption logic 156 may include decryption protocols that comply with video industry standards, for example high definition content protection (HDCP), etc. and/or other conventional and/or proprietary encryption protocols, and such decryption protocols may be the decryption counterpart protocol for encryption logic 116. Sink device 152 may also include video transport decoding logic 158 to decode the video TU stream 115 into a format that may be readily consumed by at least one sink device 152. Video transport decoding logic 158 may be configured to decode the "dummy" data and or control sequences recreated by bus tunneling decoding logic 144 to enable the at least one sink device 152 to refresh the pixel data for the current frame using the pixel data of the previous frame.

While the foregoing description is largely directed to examples using a DisplayPort packetized video transport protocol and a USB packetized bus communications protocol, it should be understood that other video transport protocols and/or bus communication protocols may be used according to the teachings herein. For example, the video transport protocol may include an HDMI video transport protocol, MPEG video transport protocol, ATSC DTV video transport protocol, etc. and/or other conventional and or proprietary video transport protocols. Also for example, the bus communications protocol may be a Thunderbolt™ bus communications protocol, network communications protocol (which may include, for example, wired and/or wireless network interface protocol), Firewire™ bus communications protocol, etc., and/or other conventional and or proprietary bus communication protocols. In addition, the source domain 102 and/or sink domain 104 may include other circuitry/logic to perform other video processing and transport operations. For example, source tunneling bridge circuitry 108 and sink tunneling bridge circuitry 140 may include respective compression/decompression logic to enable compression and decompression of a transport packet via link 138.

Figure 2A:
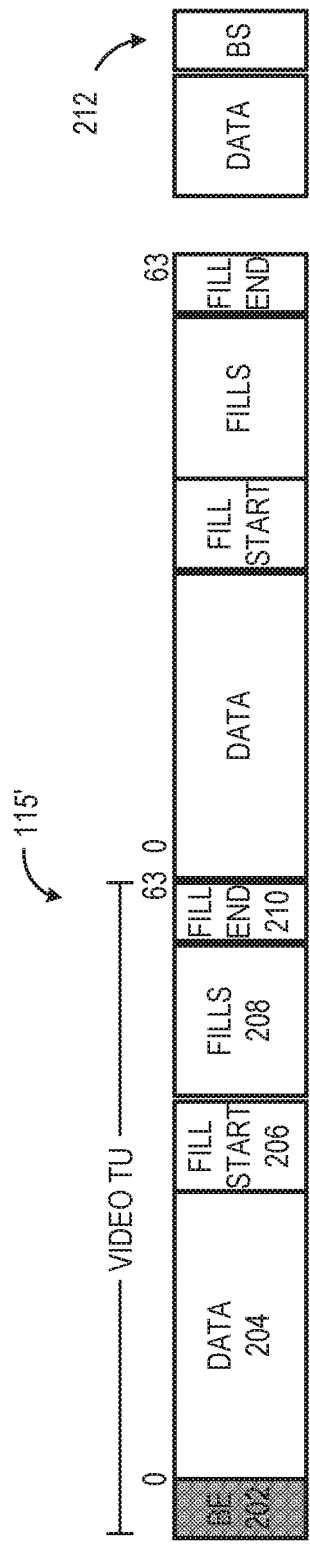
FIG. 2A illustrates an SST mode video TU according to one embodiment of the present disclosure.

With continued reference to FIG. 1, FIG. 2A illustrates an SST mode video TU 115' according to one embodiment of the present disclosure. The video TU 115' of this embodiment may include a plurality of fields defined by a video transport protocol, for example, a DisplayPort protocol. A blank end (BE) field 202 may be used to indicate a start of a scan line of a frame, and may be populated with defined sequences of symbols. In the context of the present disclosure, the BE field 202 may include a "reserved" sequence, for example a K28.7 sequence, for a scan line that is unchanged from a previous frame, or a K27.7 sequence for a scan line that is changed from a previous scan line. A data field 204 may be populated with pixel data associated with a portion of scan line. In the context of the present disclosure, the data field 204 may include "dummy" data for a scan line that is unchanged from a previous frame, or pixel data for a scan line that is changed from a previous scan line. Fill start field 206, fills field 208 and fill end field 210 may be defined by the DisplayPort protocol to, for example, align the TU with a defined byte size. In this example, the TU 115' may be 64 bytes long (excluding the BE field 202), and the TU 115' may be repeated as shown to complete a scan line of data, where the end of a scan line is indicated at 212.

Figure 2B:
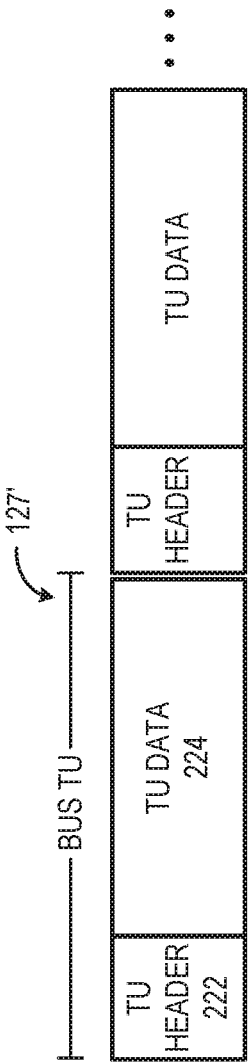
FIG. 2B illustrates an SST mode bus TU according to one embodiment of the present disclosure.

With continued reference to FIG. 1, FIG. 2B illustrates an SST mode bus TU 127' according to one embodiment of the present disclosure. The bus TU 127' of this embodiment may include a plurality of fields defined by a bus communications protocol, for example, a USB communications protocol. The bus TU 127' generally includes a header field 222 and a data field 224. The header field 222 may include fields and/or defined sequences to enable bus transport of the data field 224, for example, header field 222 may include source and destination information, byte count information, etc. The data field 224 may generally correspond to the video TU data field 204 of FIG. 2A. If the data field 204 of the video TU 115' represents unchanged "dummy" data, the unchanged "dummy" data is eliminated, in whole or in part, in the data field 224 of the bus TU 127' may be eliminated, in whole or in part, as described above.

Figure 2C:
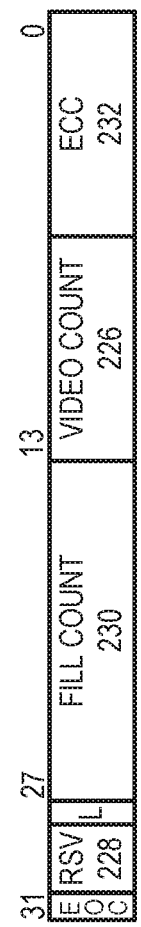
FIG. 2C illustrates an SST mode bus TU header according to one embodiment of the present disclosure.

With continued reference to FIG. 1, FIG. 2C illustrates an SST mode bus TU header 222' according to one embodiment of the present disclosure. In this embodiment, the header 222' may be used when the data field 224 represents unchanged data and is eliminated, in whole or in part, as described in detail above. The header 222' of this embodiment includes a video count field 226 that may be used to indicate how many bytes of "dummy" data are to be recreated in the sink domain 104. A reserved sequence field 228 may be used to indicate that a data field 224 has been eliminated, in whole or in part. In one example, a reserved sequence of [01] may be used in the reserved data field 228, as may be defined in the USB communications protocol. The header 222' of this embodiment may also include a fill count field 230 generally corresponding to fields 206, 208 and/or 210 of the video TU 115'. The header 222' of this embodiment may also include, for example, an error correction code (ECC) field 232 and/or other fields as may be defined by the USB protocol. In this example embodiment, the header 222' may be 32 bits long, and may be used to indicate all or part of a scan line of "dummy" data. Thus, instead of transporting "dummy" data from a source domain to a sink domain, header 222' may be used to represent at least part of a scan line of "dummy" data, and provide information to recreate the "dummy" data payload in the sink domain. The header 222' may therefore provide significant link bandwidth savings over conventional approaches.

Figure 3A:
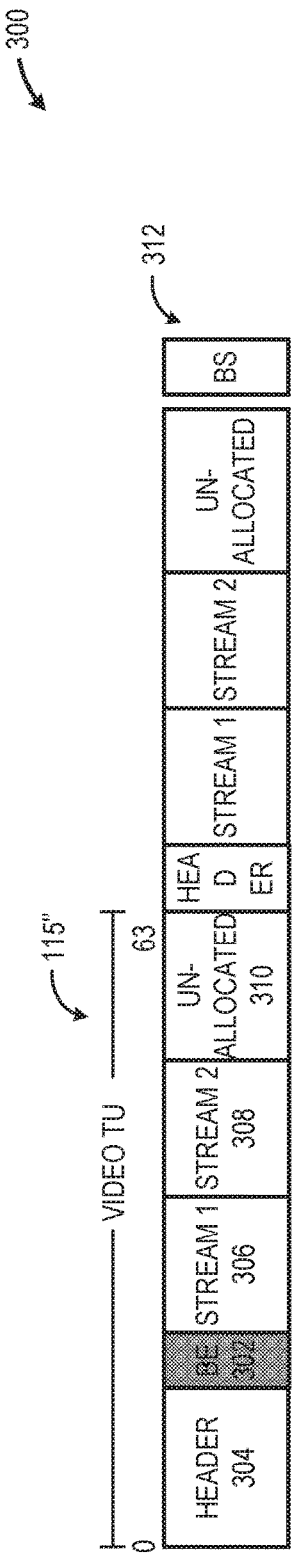
FIG. 3A illustrates an MST mode video TU according to one embodiment of the present disclosure.

With continued reference to FIG. 1, FIG. 3A illustrates an MST mode video TU 115" according to one embodiment of the present disclosure. The video TU 115" of this embodiment may include a plurality of fields defined by a video transport protocol, for example, a DisplayPort protocol. A blank end (BE) field 302 may be used to indicate a start of a scan line of a frame, and may be populated with defined sequences of symbols. In the context of the present disclosure, the BE field 302 may include, for example, a K27.7 sequence. A header field 304 may include may include source and destination information, byte count information, number of distinct video streams encapsulated in the video TU 115", etc. In MST mode, the video TU 115" may include a plurality of stream data fields, e.g., stream 1 data field 306, stream 2 data field 308, etc. Although only two stream fields are illustrated for video TU 115", it should be understood that video TU 115" may include n number of video stream data, depending on the number of video streams generated by the source domain and/or requested by the sink domain. Stream 1 data field 306 and/or stream 2 data field 308 may be populated with pixel data associated with a portion of scan line. In the context of the present disclosure, stream 1 data field 306 and/or stream 2 data field 308 may be the data field 204 may include reserved control sequences data for a scan line of a video stream that is unchanged from a previous frame, or pixel data for a scan line of a video stream that is changed from a previous scan line. Fill end field 210 may be defined by the DisplayPort protocol to, for example, align the TU with a defined byte size. In this example, the TU 115" may be 64 bytes long (excluding the BE field 302), and the TU 115' may be repeated as shown to complete a scan line of data, where the end of a scan line is indicated at 312.

Figure 3B:
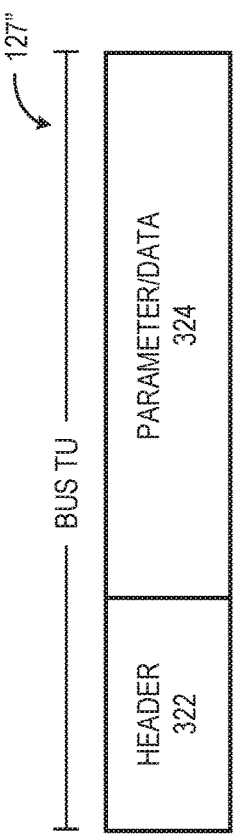
FIG. 3B illustrates an MST mode bus TU according to one embodiment of the present disclosure.

With continued reference to FIG. 1, FIG. 3B illustrates an MST mode bus TU 127" according to one embodiment of the present disclosure. The bus TU 127" of this embodiment may include a plurality of fields defined by a bus communications protocol, for example, a USB communications protocol. The bus TU 127" generally includes a header field 322 and a parameter/data field 324. The header field 322 may include fields and/or defined sequences, for example, header field 322 may include source and destination information, byte count information, number of distinct video streams encapsulated in the video TU 115", etc. Parameter/Data field 324 may generally include changed video data of stream 1 data field 306 and/or stream 2 data field 308. If stream 1 and stream 2 represent unchanged data, the parameter/data field 324 may be eliminated, in whole or in part, as described above. If one of stream 1 or stream 2 represents unchanged data, the parameter data field 324 may be reduced in size by the number of bits corresponding to the unchanged stream.

Figure 3C:
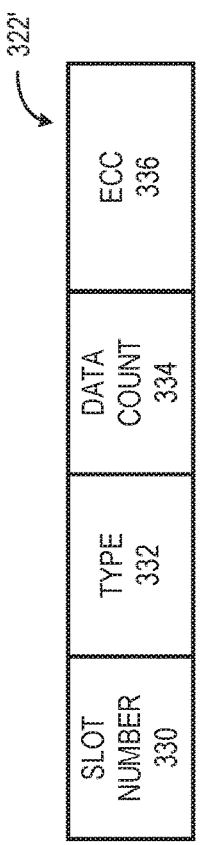
FIG. 3C illustrates an MST mode bus TU header according to one embodiment of the present disclosure.

With continued reference to FIG. 1, FIG. 3C illustrates an MST mode bus TU header 322' according to one embodiment of the present disclosure. In this embodiment, the header 322' may be used when at least one of the data fields 306 and/or 308 represent unchanged data and is/are eliminated, in whole or in part, as described in detail above. The header 322' of this embodiment includes a slot number field 330 that may be used to indicate where, in a video TU, an unchanged data payload(s) should be recreated in the sink domain 104. The header 322' of this embodiment also includes a type field 334 which may be populated with reserved data to indicate that one or more data payloads include unchanged data. For example, a reserved sequence of [14] may be used in type field 334. The header 322' of this embodiment also includes a data count field 334 that may be used to indicate how many bytes of "dummy" data are to be recreated in the sink domain 104 (or, as described above, how many bytes of reserved sequences representing unchanged data are to be recreated in the sink domain 104). The header 322' of this embodiment may also include, for example, an error correction code (ECC) field 336 and/or other fields as may be defined by the USB protocol. In this example embodiment, the header 322' may be 24 bits long, and may be used to indicate all or part of a scan line of "dummy" data. Thus, instead of transporting "dummy" data from a source domain to a sink domain, header 322' may be used to represent at least part of a scan line of "dummy" data, and provide information to recreate the "dummy" data payload in the sink domain. The header 322' may therefore provide significant link bandwidth savings over conventional approaches.

Figure 4:
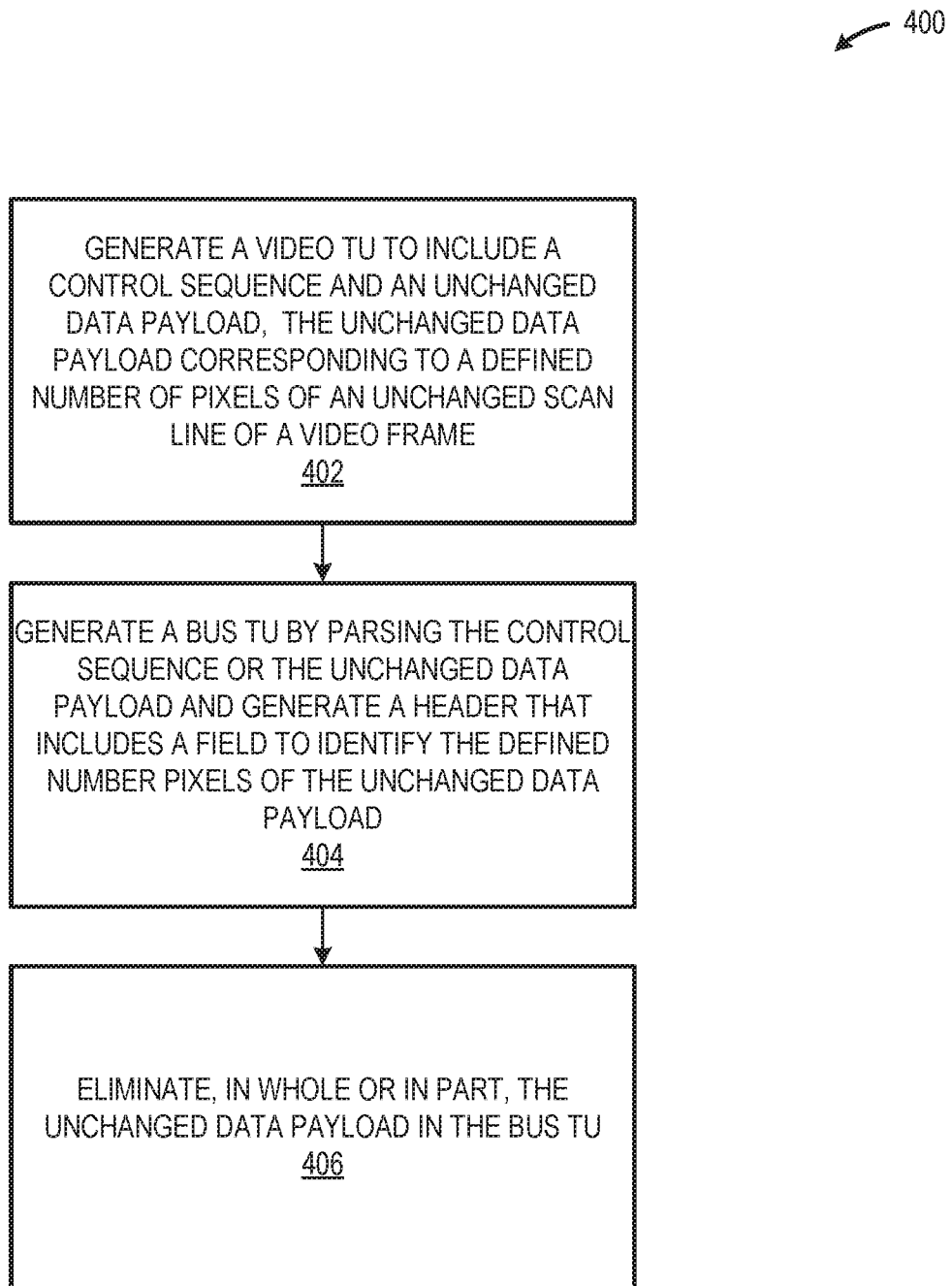
FIG. 4 is a flowchart of reducing a video stream packet size operations according to one embodiment of the present disclosure.

FIG. 4 is a flowchart 400 of reducing a video stream packet size operations according to one embodiment of the present disclosure. Operations of this embodiment generating a video transport unit (TU) that includes a control sequence and an unchanged data payload, the unchanged data payload corresponding to a defined number of pixel of an unchanged scan line of a video frame 402. Operations according to this embodiment may also include generating a bus TU by parsing the control sequence or the unchanged data payload and generating a header that includes a field to identify the defined number of pixel of the unchanged data payload 404. Operations of this embodiment may also include eliminating, in whole or in part, the unchanged data payload in the bus TU 406.

Figure 5:
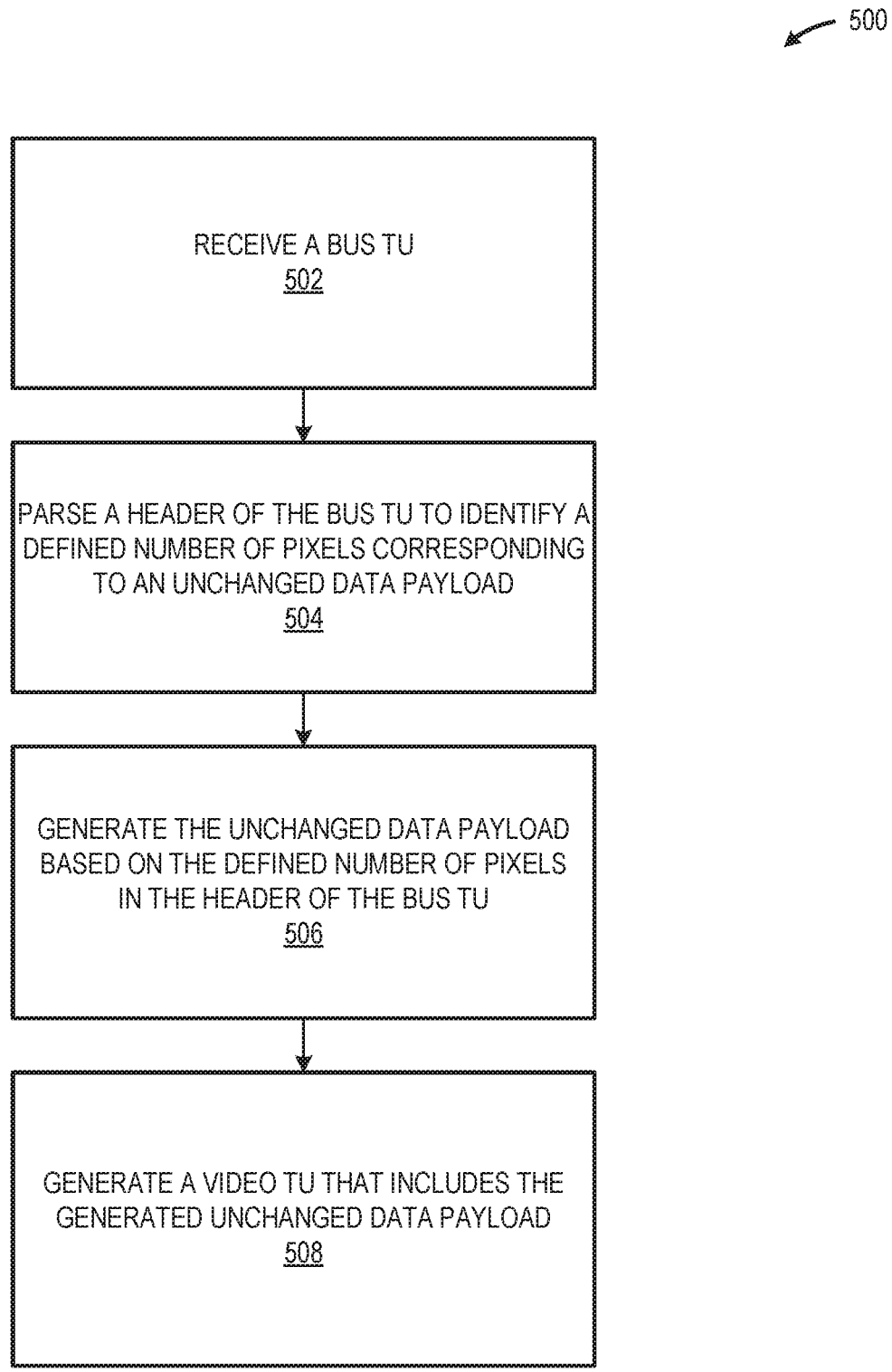
FIG. 5 is a flowchart of recreating a video transport unit (TU) having an unchanged data payload.

FIG. 5 is a flowchart 500 of recreating a video transport unit (TU) having an unchanged data payload. Operations of this embodiment include receiving a bus TU 502, and parsing a header of the bus TU to identify a defined number of pixel corresponding to an unchanged data payload 504. Operations of this embodiment also include generating the unchanged data payload based on the defined number of pixels in the header of the bus TU 506. Operations of this embodiment also include generate a video TU that includes the generated unchanged data payload 508.

Figure 6:
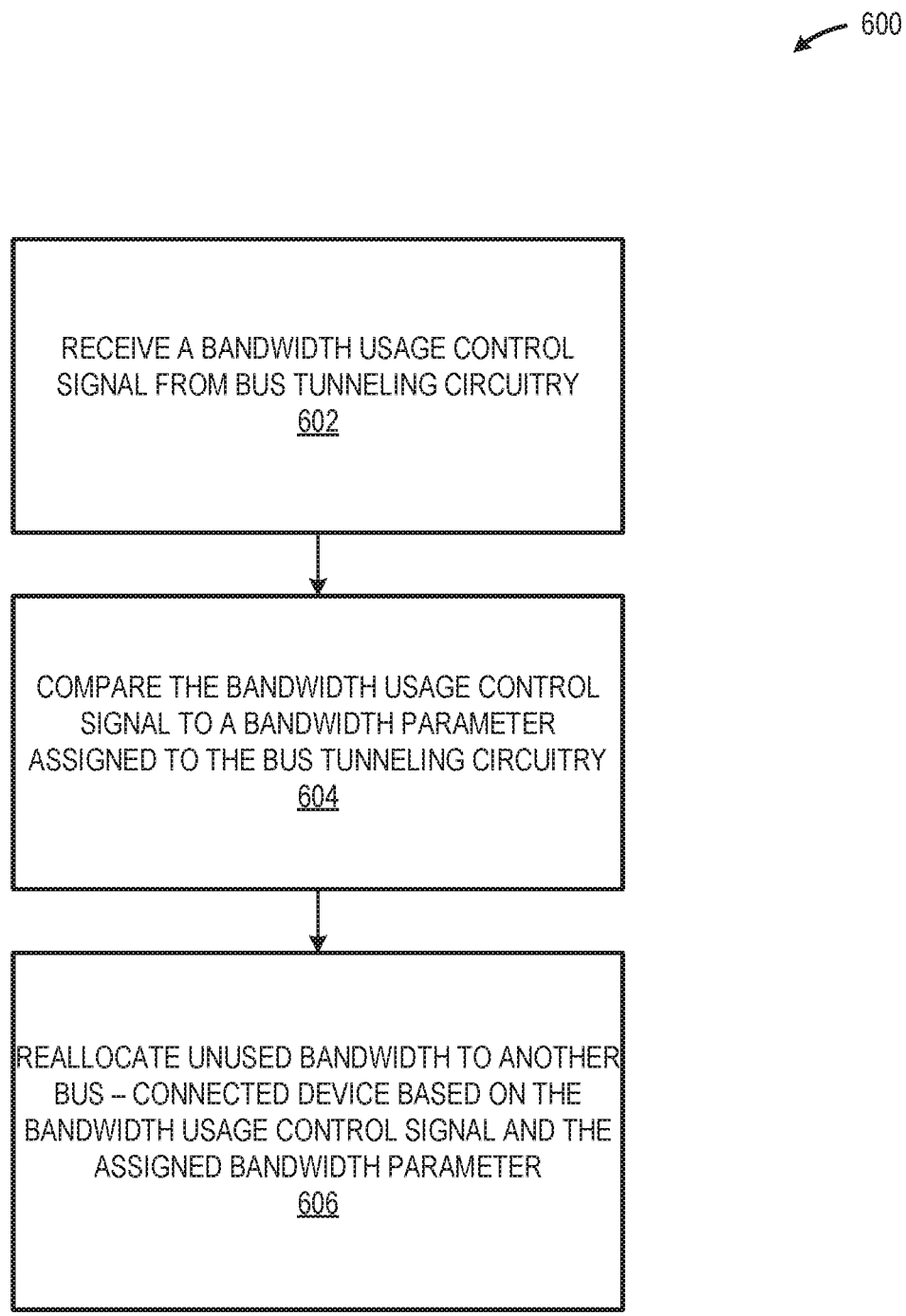
FIG. 6 illustrates a flowchart of reallocating bus bandwidth in a video transport system.

FIG. 6 illustrates a flowchart 600 of reallocating bus bandwidth in a video transport system. Operations of this embodiment include receiving a bandwidth usage control signal from bus tunneling bridge circuitry 602. Operations of this embodiment also include comparing the usage control signal to a bandwidth parameter assigned to the bus tunneling bridge circuitry 604. Operations of this embodiment also include reallocating unused bandwidth of the bus tunneling bridge circuitry to another bus-connected device based on the bandwidth usage control signal and the assigned bandwidth parameter 606.

While the flowcharts of FIGS. 4, 5 and 6 illustrate operations according various embodiments, it is to be understood that not all of the operations depicted in FIGS. 4, 5 and/or 6 are necessary for other embodiments. In addition, it is fully contemplated herein that in other embodiments of the present disclosure, the operations depicted in FIGS. 4, 5 and/or 6, and/or other operations described herein may be combined in a manner not specifically shown in any of the drawings, and such embodiments may include less or more operations than are illustrated in FIGS. 4, 5 and/or 6. Thus, claims directed to features and/or operations that are not exactly shown in one drawing are deemed within the scope and content of the present disclosure.

Embodiments of the operations described herein may be implemented in a system that includes one or more storage devices having stored thereon, individually or in combination, instructions that when executed by one or more processors perform the one or more of the operations described herein. The processor may include, for example, a processing unit, and/or programmable circuitry, and/or logic units, etc. The storage device may include any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry. "Logic", as used herein, may comprise, singly or in any combination circuitry and/or code and/or instructions sets (e.g., software, firmware, etc.).

The following examples pertain to further embodiments.

According to example 1 there is provided a video transport system that includes graphics processing circuitry to generate a video transport unit (TU) corresponding to a scan line of a first video frame that is unchanged from a second video frame, wherein the video TU includes a control sequence and an unchanged data payload corresponding to a defined number of pixels of the scan line of the first video frame. Example 1 also includes source tunneling bridge circuitry to generate a bus TU based on the video TU; the source tunneling bridge circuitry to parse the control sequence or the unchanged data payload of the video TU, and to generate the bus TU having a header that includes a data field to identify the defined number of pixels of the unchanged data payload, and to eliminate, in whole or in part, the unchanged data payload in the bus TU.

Example 2 may include elements of example 1 and wherein the unchanged data payload includes data that is selected from one of "dummy" data or reserved control sequences, the reserved control sequences being defined by a packetized video transport protocol.

Example 3 may include elements of any of the previous examples and wherein the control sequence is a reserved control sequence, the reserved control sequence being defined by a packetized video transport protocol.

Example 4 may include elements of any of the previous examples and wherein the control sequence, the unchanged data payload and the header are unencrypted.

Example 5 may include elements of any of the previous examples and wherein the bus TU complies with a packetized serial bus communications protocol.

Example 6 may include elements of any of the previous examples and further comprising transmit circuitry to transmit the bus TU to a video sink domain.

Example 7 may include elements of any of the previous examples and wherein the video TU complies with a packetized video transport protocol.

Example 8 may include elements of any of the previous examples and further including bus controller circuitry to control the operation of at least one bus-connected device; the bus controller circuitry including bandwidth allocation logic to set at least one bandwidth parameter for source tunneling bridge circuitry to transmit the bus TU; and wherein the tunneling bridge circuitry to generate a bandwidth control signal indicating bandwidth requirement information to transmit the bus TU; and wherein the bandwidth allocation logic to reassign bandwidth to the at least one bus-connected device based on the at least one bandwidth parameter and the bandwidth requirement information.

Example 9 may include elements of any of the previous examples and further including sink tunneling bridge circuitry to receive the bus TU and generate the unchanged data payload of the video TU based on the bus TU; the source tunneling bridge circuitry to parse the header of the bus TU and generate the unchanged data payload based on, at least in part, the data field in the header.

According to example 10 there is provided at least one computer-readable device having stored thereon instructions that, when executed by at least one processor, perform operations including: generate a video transport unit (TU) corresponding to a scan line of a first video frame that is unchanged from a second video frame, wherein the video TU includes a control sequence and an unchanged data payload corresponding to a defined number of pixels of the scan line of the first video frame; parse the control sequence or the unchanged data payload of the video TU; and generate a bus TU having a header that includes a data field to identify the defined number of pixels of the unchanged data payload, and eliminate, in whole or in part, the unchanged data payload in the bus TU.

Example 11 may include elements of example 10 and wherein the unchanged data payload includes data that is selected from one of "dummy" data or reserved control sequences, the reserved control sequences being defined by a packetized video transport protocol.

Example 12 may include elements of example 10 and wherein the control sequence is a reserved control sequence, the reserved control sequence being defined by a packetized video transport protocol.

Example 13 may include elements of example 10 and wherein the control sequence, the unchanged data payload and the header are unencrypted.

Example 14 may include elements of example 10 and wherein the bus TU complies with a packetized serial bus communications protocol.

Example 15 may include elements of example 10 and further including instructions, that when executed by the at least one processor, result in further operations comprising: transmit the bus TU to a video sink domain.

Example 16 may include elements of example 10 and wherein the video TU complies with a packetized video transport protocol.

Example 17 may include elements of example 10 and further including instructions, that when executed by the at least one processor, result in further operations including: generate a bandwidth control signal indicating bandwidth requirement information to transmit the bus TU.

Example 18 may include elements of examples 10 and 17 and further including instructions, that when executed by the at least one processor, result in further operations including: assign at least one bandwidth parameter for to transmit the bus TU; and reassign bandwidth to at least one bus-connected device based on the at least one bandwidth parameter and the bandwidth requirement information.

Example 19 may include elements of example 10 and further including instructions, that when executed by the at least one processor, result in further operations including: receive the bus TU; and parse the header of the bus TU and generate the unchanged data payload based on, at least in part, the data field in the header.

According to example 20 there is provided a video transport system that includes: graphics processing circuitry to generate an unchanged video transport unit (TU) corresponding to a scan line of a first video frame that is unchanged from a second video frame, wherein the unchanged video TU includes a first control sequence and an unchanged data payload corresponding to a defined number of pixels of the scan line of the first video frame; the graphics processing circuitry also to generate a changed video transport unit (TU) corresponding to a scan line of the first video frame that is changed from the second video frame, wherein the changed video TU includes a second control sequence and an changed data payload corresponding to a defined number of pixels of the scan line of the first video frame. The video transport system of this example also includes source tunneling bridge circuitry to generate a bus TU based on the unchanged video TU; the source tunneling bridge circuitry to parse the first control sequence or the unchanged data payload of the unchanged video TU, and to generate the bus TU having a header that includes a data field to identify the defined number of pixels of the unchanged data payload, and to eliminate, in whole or in part, the unchanged data payload in the bus TU.

Example 21 may include elements of example 20 and wherein the unchanged data payload includes data that is selected from one of "dummy" data or reserved control sequences, the reserved control sequences being defined by a packetized video transport protocol.

Example 22 may include elements of example 20 and wherein the first control sequence is a reserved control sequence, the reserved control sequence being defined by a packetized video transport protocol.

Example 23 may include elements of example 20 and further including encryption logic to encrypt the changed data payload, and wherein the first control sequence, the unchanged data payload and the header, are unencrypted.

Example 24 may include elements of example 20 and further including bus controller circuitry to control the operation of at least one bus-connected device; the bus controller circuitry including bandwidth allocation logic to set at least one bandwidth parameter for source tunneling bridge circuitry to transmit the unchanged bus TU; and wherein the tunneling bridge circuitry to generate a bandwidth control signal indicating bandwidth requirement information to transmit the unchanged bus TU; and wherein the bandwidth allocation logic to reassign bandwidth to the at least one bus-connected device based on the at least one bandwidth parameter and the bandwidth requirement information.

Example 25 may include elements of example 20 and further including sink tunneling bridge circuitry to receive the bus TU and generate the unchanged data payload of the unchanged video TU based on the bus TU; the source tunneling bridge circuitry to parse the header of the bus TU and generate the unchanged data payload based on, at least in part, the data field in the header.

According to example 26 there is provided a video processing system that includes means to generate a video transport unit (TU) corresponding to a scan line of a first video frame that is unchanged from a second video frame, wherein the video TU includes a control sequence and an unchanged data payload corresponding to a defined number of pixels of the scan line of the first video frame. The video processing system of this example also includes means to generate a bus TU based on the video TU; means to parse the control sequence or the unchanged data payload of the video TU, and means to generate the bus TU having a header that includes a data field to identify the defined number of pixels of the unchanged data payload, and to eliminate, in whole or in part, the unchanged data payload in the bus TU.

Example 27 may include elements of example 26 and wherein the unchanged data payload includes data that is selected from one of "dummy" data or reserved control sequences, the reserved control sequences being defined by a packetized video transport protocol.

Example 28 may include elements of example 26 and wherein the control sequence is a reserved control sequence, the reserved control sequence being defined by a packetized video transport protocol.

Example 29 may include elements of example 26 and wherein the control sequence, the unchanged data payload and the header are unencrypted.

Example 30 may include elements of example 26 and wherein the bus TU complies with a packetized serial bus communications protocol.

Example 31 may include elements of example 26 and further includes means to transmit the bus TU to a video sink domain.

Example 32 may include elements of example 26 and wherein the video TU complies with a packetized video transport protocol.

Example 33 may include elements of example 26 and further including means to control the operation of at least one bus-connected device including bandwidth allocation means to set at least one bandwidth parameter for source tunneling bridge circuitry to transmit the bus TU; and wherein the means to generate a bus TU to generate a bandwidth control signal indicating bandwidth requirement information to transmit the bus TU; and wherein the bandwidth allocation means to reassign bandwidth to the at least one bus-connected device based on the at least one bandwidth parameter and the bandwidth requirement information.

Example 34 may include elements of example 26 and further including means to receive the bus TU and generate the unchanged data payload of the video TU based on the bus TU, including means to parse the header of the bus TU and generate the unchanged data payload based on, at least in part, the field of the header.

According to example 35 there is provided a method to reduce a video stream packet size, including generating a video transport unit (TU) that includes a control sequence and an unchanged data payload, the unchanged data payload corresponding to a defined number of pixel of an unchanged scan line of a video frame. The method of this example also includes generating a bus TU by parsing the control sequence or the unchanged data payload and generating a header that includes a field to identify the defined number of pixel of the unchanged data payload. The method of this example also includes eliminating, in whole or in part, the unchanged data payload in the bus TU.

According to example 36 there is provided a method to recreate a video transport unit (TU) having an unchanged data payload, the method of this example includes receiving a bus TU and parsing the header of the bus TU to identify a defined number of pixels corresponding to an unchanged data payload. The method of this example also includes generating an unchanged data payload based on the defined number of pixels corresponding to the unchanged data payload and generating a video TU that includes the generated unchanged data payload.

According to example 37 there is provided a method to reallocate bus bandwidth in a video transport system, the method of this example includes receiving a bandwidth usage control signal from bus tunneling bridge circuitry. The method of this example also includes comparing the usage control signal to a bandwidth parameter assigned to the bus tunneling bridge circuitry. The method of this example also includes reallocating unused bandwidth of the bus tunneling bridge circuitry to another bus-connected device based on the bandwidth usage control signal and the assigned bandwidth parameter.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A video transport system, comprising:
   graphics processing circuitry to generate a current video transport unit (TU) corresponding to a scan line of a current video frame having a data payload that is unchanged from a previous video frame; and
   source tunneling bridge circuitry to:
   generate a bus TU based on the video TU;
   eliminate, in whole or in part, the unchanged data payload from the bus TU, the bus TU to be transmitted without the unchanged data payload;
   generate a bus TU header having information to be used to recreate the unchanged data payload after transmission of the bus TU on a bus to which the source tunneling bridge circuitry is connected; and
   adjust a bandwidth control signal when the data payload of the bus TU has been eliminated, the bandwidth control signal to indicate that additional bandwidth is to be allocated to one or more non-display devices communicably coupled to the same bus to which the source tunneling bridge circuitry is communicably coupled, an amount of the additional bandwidth based on a reduced size of the bus TU associated with the elimination of the data payload from the bus TU; and
   bus controller circuitry including bandwidth allocation logic to allocate, based on the adjusted bandwidth control signal, the additional bandwidth to the one or more non-display devices coupled to the bus.

2. The video transport system of claim 1, wherein the graphics processing circuitry is further to replace a portion of the video TU containing the unchanged data payload with at least one of "dummy" data or reserved control sequences.

3. The video transport system of claim 1, wherein the bus TU complies with a packetized serial bus communications protocol.

4. The video transport system of claim 1, further including transmit circuitry to transmit the bus TU to a sink device.

5. The video transport system of claim 1, wherein the video TU complies with a packetized video transport protocol.

6. The video transport system of claim 1, further including sink tunneling bridge circuitry to generate the current data payload based on the information included in a bus TU header when the bus TU does not include the current data payload.

7. At least one computer-readable storage device comprising instructions that, when executed by at least one processor, cause the at least one processor to at least:
   generate a video transport unit (TU) corresponding to a scan line of a first video frame that is unchanged from a second video frame, wherein the video TU includes a control sequence and an unchanged data payload corresponding to a defined number of pixels of the scan line of the first video frame;
   parse the control sequence or the unchanged data payload of the video TU;
   generate a bus TU based on the video TU, the bus TU having a header that includes a field to identify the defined number of pixels of the unchanged data payload;
   eliminate, in whole or in part, the unchanged data payload in the bus TU, the bus TU to be transmitted without the unchanged data payload; and
   allocate additional bandwidth to one or more non-display devices coupled to a same bus as the at least one processor, an amount of the additional bandwidth to be based on a size reduction of the bus TU associated with the elimination of the unchanged data payload.

8. The at least one computer-readable storage device of claim 7, wherein the bus TU is unencrypted when transported on the bus to a sink device.

9. The at least one computer-readable storage device of claim 7, wherein the bus TU complies with a packetized serial bus communications protocol.

10. The at least one computer-readable storage device of claim 7, wherein the instructions, when executed by the at least one processor, cause the bus TU to be transmitted to a video sink domain.

11. The at least one computer-readable storage device of claim 7, wherein the video TU complies with a packetized video transport protocol.

12. The at least one computer-readable storage device of claim 7, wherein the instructions, when executed by the at least one processor, generate a bandwidth control signal indicating bandwidth information associated with transmission of the bus TU on the bus.

13. The at least one computer-readable storage device of claim 12, wherein the instructions, when executed by the at least one processor, cause the at least one processor to assign at least one bandwidth parameter, wherein the allocation of the additional bandwidth is based on the at least one bandwidth parameter and the bandwidth information.

14. A video transport system, comprising:
memory; and
graphics processing circuitry to:
    generate an unchanged video transport unit (TU) corresponding to a scan line of a first video frame that is unchanged from a second video frame, wherein the unchanged video TU includes a control sequence and an unchanged data payload corresponding to a defined number of pixels of the scan line of the first video frame; and
source tunneling bridge circuitry to:
    generate a bus TU based on the unchanged video TU;
    generate a bus TU header having information to be used to recreate the unchanged data payload; and
    eliminate the unchanged data payload of the bus TU, in whole or in part, the bus TU to be transmitted without the eliminated, unchanged data payload; and
bus controller circuitry to allocate, when the unchanged data payload of the bus TU has been eliminated in whole or in part, additional bandwidth to one or more non-display devices communicably coupled to a same bus as the source tunneling bridge circuitry, an amount of the additional bandwidth to be based on a reduced size of the bus TU associated with the elimination of the unchanged data payload from the bus TU.

15. The video transport system of claim 14, wherein a format of the bus TU is defined by a packetized video transport protocol.

16. The video transport system of claim 14, including bus controller circuitry to control the operation of at least one bus-connected device, the bus controller circuitry including bandwidth allocation logic to set at least one bandwidth parameter for the source tunneling bridge circuitry to transmit the bus TU, the additional bandwidth based on the at least one bandwidth parameter and bandwidth information.

* * * * *